(12) United States Patent
Simonian et al.

(10) Patent No.: US 7,545,634 B2
(45) Date of Patent: Jun. 9, 2009

(54) NOTEBOOK COMPUTER FOLDING ERGONOMIC PAD

(75) Inventors: Michael Simonian, San Francisco, CA (US); Maaike Evers, San Francisco, CA (US)

(73) Assignee: ACCO Brands USA LLC, Redwood Shores, CA (US)

( * ) Notice: Subject to any disclaimer, the term of this patent is extended or adjusted under 35 U.S.C. 154(b) by 400 days.

(21) Appl. No.: 11/454,292

(22) Filed: Jun. 16, 2006

(65) Prior Publication Data

US 2006/0285283 A1 Dec. 21, 2006

Related U.S. Application Data

(60) Provisional application No. 60/690,927, filed on Jun. 16, 2005.

(51) Int. Cl.
G06F 1/16 (2006.01)
H05K 5/00 (2006.01)
H05K 7/00 (2006.01)

(52) U.S. Cl. ..................................... 361/683
(58) Field of Classification Search .................. 361/683
See application file for complete search history.

(56) References Cited

U.S. PATENT DOCUMENTS

| 5,287,254 | A  | * | 2/1994 | Solman | 362/98 |
| 6,819,554 | B2 | * | 11/2004 | Juneau | 361/683 |
| 2004/0022021 | A1 | * | 2/2004 | Bovino | 361/683 |

* cited by examiner

*Primary Examiner*—Javaid Nasri
(74) *Attorney, Agent, or Firm*—Michael E. Woods

(57) ABSTRACT

A system, apparatus, and method for portable computing systems that simply and efficiently addresses poor ergonomics, heat buildup, and/or electromagnetic radiation, most preferably in one integrated solution. The apparatus includes a unitary blank of a substantially planar rigid sheet material including a plurality of panel portions interdivided by one or more bending line portions, wherein the unitary blank folds along the one or more bending line portions to produce a three-dimensional structure that supports a portable electronic device on at least one the panel portion over a surface at an angle inclined relative to the surface; and a fastening subsystem, coupled to the unitary blank, having a holding mode for maintaining the unitary blank folded in the three-dimensional structure and a release mode for transitioning the three-dimensional structure to a planar structure, the fastening subsystem providing for repeatable transitions between the holding mode and the release mode.

14 Claims, 8 Drawing Sheets

NOTEBOOK COMPUTER FOLDING ERGONOMIC PAD

CROSS-REFERENCE TO RELATED APPLICATIONS

This Application is a Non-Prov of Prov (35 USC 119(e)) application 60/690,927 filed on Jun. 16, 2005.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

This application relates generally to notebook computer accessories, and more specifically to ergonomic structures and methods complementary to portable computing systems.

Laptop, or notebook computers are growing in popularity. Because of their portability, they are commonly used in the office, in the home, on airplanes, and in many other places. While notebook computers bring many advantages over traditional desktop computers or PCs, they also bring many challenges, including:

1) Poor ergonomics—In a traditional PC workstation environment, the keyboard and display are separate. This allows them to be positioned at the height and distance most appropriate for the user. In a workstation environment centered around a notebook computer, the ergonomics of the notebook are restricted because the display and the keyboard are typically attached to each other. This may lead to poor ergonomics and back and neck strain. Some typical solutions to this challenge include: a) plugging a separate display into the notebook and continue using the keyboard of the notebook (The display can be positioned at the ideal height); b) plugging both a separate display and a separate keyboard into the notebook and position theme both independently at the desired height; c) raising the notebook onto a stand so that the notebook's display is at the ideal height and use a separate keyboard; and d) raising the notebook at an angle using a support (e.g., a wedge-shaped stand) so that the display is closer to eye-level while the keyboard is still usable, though it is angled toward the user. Since many notebook users do not use their notebook exclusively, they often do not go through the extra effort to create an ergonomically improved notebook computer work environment. Often, notebook users have their backs arched and their neck tilted forward in an uncomfortable way. Also, because notebook computers are used in a variety of places, mobile users cannot typically carry, or choose to carry, ergonomic devices with them because they are usually too bulky.

2) Heat buildup in a notebook computer—With ever-increasing processor speeds, notebook computers run very hot. Devices to help dissipate heat and even actively cool notebook computers are more and more common. Some examples are pads with integrated cooling fans that are placed under notebook computers and hard plastic stands that improve cooling by lifting the notebook computer off of the desktop surface. There is also evidence to suggest that the heat buildup on a person's lap while using a notebook computer on their lap can cause physical damage to the user including harm to the reproductive system. Also, notebook computers are commonly used in places where heat buildup is even more of a problem, such as in bed, on couches, while watching TV, and the like. Soft surfaces such as pillows, blankets, and the like tend to block the notebook computer's cooling channels and heat dissipation channels and cause them to run hotter.

3) Electromagnetic radiation—Electromagnetic frequencies or EMFs are receiving more and more awareness as being potentially harmful to humans. While the actual effects of EMFs on humans is being actively debated, there is no question that many appliances and machines in use in people's home give off easily measurable amounts of EMF. Notebook computers are no exception. Many notebook computers give off measurable amounts of EMF from their bottom-exactly the surface that comes in contact with the user-often for prolonged periods of time. While it is unknown whether EMFs from notebook computers are in fact harmful, a product that protects users from EMFs may be a valued and commercially successful item.

Portable computer users generally have a special purpose carrying case for use with the system. Capacity and construction generally do not lend themselves to significant carrying capacity both because of portability and because of weight.

What is needed are systems and methods for portable computing systems to simply and efficiently address poor ergonomics, heat buildup, and electromagnetic radiation, most preferably in one integrated solution.

BRIEF SUMMARY OF THE INVENTION

Disclosed is a system, apparatus, and method for portable computing systems that simply and efficiently addresses poor ergonomics, heat buildup, and/or electromagnetic radiation, most preferably in one integrated solution. The apparatus includes a unitary blank of a substantially planar rigid sheet material including a plurality of panel portions interdivided by one or more bending line portions, wherein the unitary blank folds along the one or more bending line portions to produce a three-dimensional structure that supports a portable electronic device on at least one the panel portion over a surface at an angle inclined relative to the surface; and a fastening subsystem, coupled to the unitary blank, having a holding mode for maintaining the unitary blank folded in the three-dimensional structure and a release mode for transitioning the three-dimensional structure to a planar structure, the fastening subsystem providing for repeatable transitions between the holding mode and the release mode.

The method includes: a) folding a unitary blank of a substantially planar sheet material including a plurality of panel portions interdivided by one or more bending line portions along the one or more bending line portions to produce a three-dimensional structure that supports a portable electronic device on at least one panel portion over a surface at an angle inclined relative to the surface; and b) transitioning the three-dimensional structure into a holding mode wherein the plurality of panel portions folded along the one or more bending line portions resist unfolding.

The disclosed embodiments simply and efficiently address poor ergonomics, heat buildup, and electromagnetic radiation, most preferably in one integrated solution. A unitary blank is foldable into a support structure, and this structure may adapted for addressing various environmental conditions, including for example heat and electromagnetic frequencies. Some of the goals of the embodiments of the present invention include: a) to provide a more ergonomic environment for notebook computer users; b) to provide a cooler environment for notebook computers; c) to provide protection for the user against heat-buildup near the body; d)

to provide protection against electromagnetic frequencies (EMFs); and e) to provide the above goals in a portable, space-efficient, appealing, and fun way.

BRIEF DESCRIPTION OF THE DRAWINGS

FIG. 8 is a perspective view of the support including the unitary blank sheet as described above except including a pair of bands (or straps-optionally elastomeric) as the retaining system to hold an electronic device onto the FACE when the sheet is transitioned to the folded support mode;

FIG. 9 is the perspective view of the support shown in FIG. 8 partially folded;

FIG. 10 is the perspective view of the support shown in FIG. 9 completely folded;

DETAILED DESCRIPTION OF THE INVENTION

Figure 1:
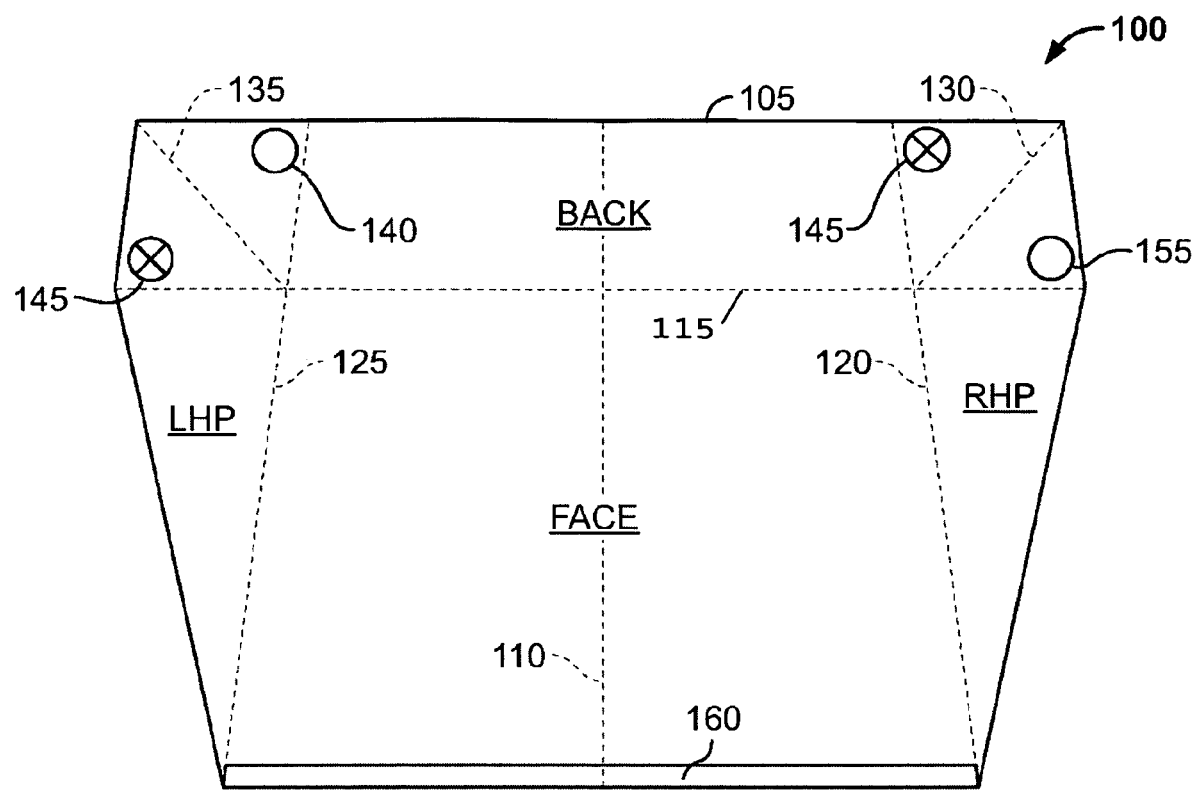
FIG. 1 is a top plan view of an unfolded support including a unitary blank sheet subdivided into fold/crease/bending portions that permit the sheet to bend and fold into a three-dimensional support structure.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Some embodiments of the invention include a mostly flat surface with pre-creased areas that allow these areas to fold up creating a three-dimensional shape that acts as a stand to raise a notebook computer to a more comfortable and more ergonomic position. Embodiments of the invention may be made of materials that dissipate heat from the notebook computer and/or insulate the user from heat generated by the computer. Furthermore, embodiments of the invention may also contain materials such as metal or fabric shielding that improve protection to the user from electromagnetic frequencies or other environmental hazards. Some embodiments may include two or three modes—an unfolded position, a folded stand position, and an optional folded storage position.

Unfolded Position:

In an unfolded position, some embodiments of the invention may be placed on a lap of the user. In this position, these embodiments provide a firmer surface than the lap and therefore permit the notebook computer to run cooler than it would on the soft lap of the user, particularly when the user has a cushion or other barrier on the lap interposed between the lap and the notebook computer. In addition, in this position, some embodiments of the invention provide EMF protection for the user. A raised area (for example) at a front edge acts as a barrier to prevent the notebook computer from sliding off, and this feature may be satisfied in several other different ways as described below.

Folded Stand Position:

Embodiments of the invention are folded along crease/bend lines and most preferably fastened (e.g., snapped with snaps) or otherwise locked into position to create a stand that lifts the notebook computer to a more comfortable and more ergonomic position. In this folded stand position, some embodiments may be used on a desktop surface, on the lap, or in other applications such as in bed, on an airplane tray table, on the couch, on the floor, and the like. A raised area at the front edge acts as a barrier to prevent the notebook computer from sliding off. Some embodiments the invention may have raised surfaces integrated into a top surface. The raised surfaces are one example of environmental adaptation and would allow air to flow under the notebook computer for cooler operation. The raised surfaces may also be made out of a rubber or otherwise grippy/high coefficient of friction material to help keep the notebook computer from sliding off of the stand in addition to or in lieu of the raised front edge. Still other solutions may include bands/straps at corners of the top/front support surface to hold the notebook in place (these bands may be elastomeric).

Folded storage position:

Some embodiments of the invention may also be optionally folded in half into a predominately flat configuration for storage in a notebook computer bag, backpack, closet, car, and the like. Preferably in this position, these embodiments will fit within a footprint size of a notebook computer and thus be easily ported and deployed.

Embodiments of the invention may be manufactured from a variety of materials. One preferred embodiment includes using fabric-over-foam molding. This technique is commonly used for sunglass cases and backpacks. In this way, the crease/bend-lines may be easily molded in to the shape to allow the product to fold correctly. In an embodiment like this, soft neoprene padding and electromagnetic shielding material may be sandwiched in between layers of fabric. The parts are sandwiched and adhered, then are compression-molded to achieve the proper crease lines, logos, and/or other required features.

In other embodiments, a structure may be made using more typical cut and sew soft goods techniques where the crease/bend lines are achieved by incorporating internal pads or plates along with any electromagnetic shielding or environmental protective material spaced away from each other and sewing or attaching fabric over the plates. The product would hinge in the areas of unsupported fabric between the individual plates.

In still other embodiments, a structure may be made using harder materials including but not limited to: plastic, hard foam, wood, fiberglass, and the like along with flexible fabric hinge areas or mechanical hinges to allow the product to fold. In either of these construction methods, any raised area may be achieved by folding part of the pad over itself and attaching it to itself, thereby forming a lip to keep the notebook computer from sliding past it. Another way to prevent the notebook computer from sliding off of the stand is to integrate a hard stop made of metal, plastic, and the like to block the notebook from sliding past the front edge. Another way to prevent the notebook computer from sliding off of the stand is to use one or more soft straps (or elastomeric bands) to attach the notebook to the top surface of the structure. Another way to prevent the notebook computer from sliding off of the stand is to use rubber or other soft grippy/high coefficient of friction materials integrated onto the top surface.

Embodiments of the invention can also be made from a number of layers of various materials sewn, glued, or otherwise attached to each other in a combination that achieves desired properties including but not limited to: heat dissipation, heat insulation, padding for comfort, EMF shielding, other environmental protection/enhancement, structural stiffness, fashion, and the like. Some of the materials that may be integrated into the product include but are not limited to: Cordura, leather, various fabrics, decorative fabrics, shielding fabric, shielding metal, fiberglass sheets, plastic sheets, hard foam sheets, soft foam pads, molded foam pads, non-slip fabrics, non-slip plastic molded, printed, or silk-screened over fabric, netting, and the like. Additional features may also be integrated into some embodiments such as open pockets or zippered pockets for pens, computer input devices, music players and other accessories. The materials used in the construction of Embodiments of the invention are most preferably lightweight and space efficient, for example in order to make it easy and convenient for travel.

Certain embodiments include a fastening system or other structural element, configuration, or relationship to provide a holding mode in the folded stand position, permitting these embodiments to be locked or otherwise maintained in that position using a variety of techniques including but not limited to: snaps, hook and loop fasteners, straps, elastic bands, mechanical locks, hooks, over-center hinging, magnets, zippers, or even the weight of the notebook computer for example. Some of these same techniques may also be used to hold the structure into the optional folded storage position.

In addition, various functions of one or more of the embodiments described above may be integrated separately into other products. For example, some embodiments may have the folding features and ergonomic stand features mentioned above, but without the EMF shielding features and/or cooling/heat insulation features. Other embodiments may not have the folding and ergonomic stand functionality mentioned above but will only have the EMF shielding and/or cooling/heat insulation features. Still other embodiments of the invention may include a notebook computer carrying case that transforms into an ergonomic notebook computer stand. Further embodiments of the invention may include a notebook computer carrying case that is adapted to provide support/environmental feature structures as a separate unit inside it.

FIG. 1 is a top plan view of an unfolded support 100 including a unitary blank sheet 105 subdivided into fold/crease/bending portions that permit sheet 105 to bend and fold into a three-dimensional support structure. An optional bending portion 110 permits sheet 105 to be folded into a smaller footprint size for storage. A back bending portion 115, a right-hand bending portion 120, a left-hand bending portion 125, a first corner bending portion 130, and a second corner bending portion 135 all provide for sheet 105 to fold into a three-dimensional support mode as further explained below. FIG. 1 defines some major panel portions, including a FACE, a BACK, a right-hand panel (RHP), and a left-hand panel (LHP). When sheet 105 is folded along crease/bend lines into the three-dimensional holding mode, the major panel portions are all that are visible.

Support 100 includes a fastening system including two pairs of snap fasteners, a first female snap 140 and a first male snap 145 (pair 1), and a second female snap 150 and a second male snap 155 (pair 2). In the optional folding mode for storage, the snaps of pair 1 engage the complementary snaps of pair 2 when sheet 105 is folded about bend portion 110. In the holding mode, the complementary snaps of pair 1 engage one another and the complementary snaps of pair 2 engage one another. (In the support mode, sheet 105 folds about bend portion 115, bend portion 120, bend portion 125, bend portion 130, and bend portion 135 so that the pairs of snaps may engage as described.) The fastening system may be implemented in numerous ways including zippers, repetitive latching systems (e.g., zippers and hook/loop systems), and even by careful construction and material selection and configuration permitting sheet material 105 to remain folded and resist unfolding without positive interlocking elements, particularly when the FACE panel is loaded.

Figure 2:
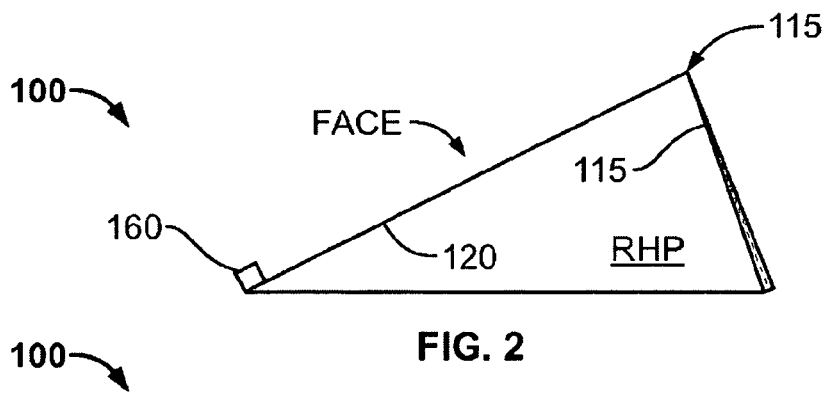
FIG. 2 is a right-hand plan side view of a folded unitary blank sheet shown in FIG. 1 transitioned to a holding mode.
Figure 3:
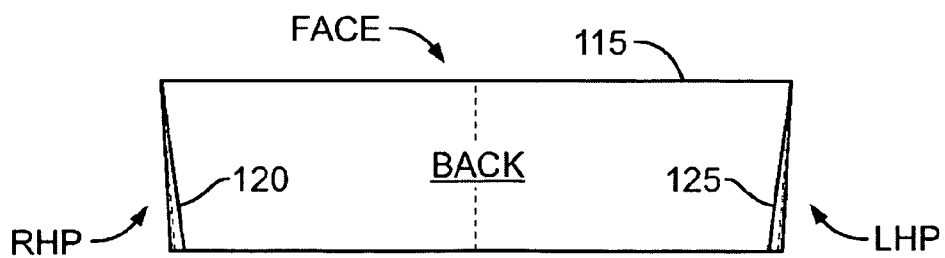
FIG. 3 is a back plan view of the folded unitary blank sheet shown in FIG. 2.
Figure 4:
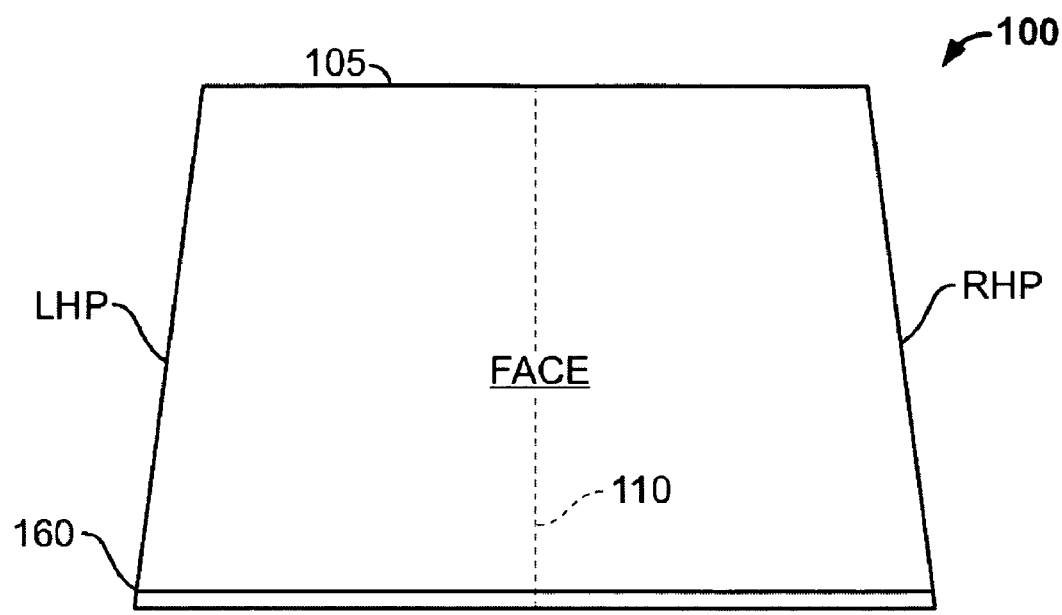
FIG. 4 is a front plan view of the folded unitary blank sheet shown in FIG. 2 and FIG. 3.

Support 100 includes a retaining subsystem (shown in FIG. 1 as a lip 160) for inhibiting an object placed on a FACE panel when support is in the folded three-dimensional support mode from sliding off of the face. Other structures may be used for the retaining subsystem, including bands/straps at a downward edge of the FACE FIG. 2 is a right-hand plan side view of support 100 shown in FIG. 1 transitioned to a holding mode and FIG. 3 is a back plan view of support 100 shown in FIG. 2, and FIG. 4 is a front plan view of the folded support 100 shown in FIG. 2 and FIG. 3. When folded, the FACE panel is rigidly supported at an angle (preferably about at ten to forty-five degrees, and most preferably about twenty-seven degree (plus/minus about five degrees) angle) to the horizontal and to an underlying surface (not shown) by the BACK panel, the RHP, and the LHP. A notebook computer is supported on the FACE panel, either in the unfolded or folded support modes.

Figure 5:
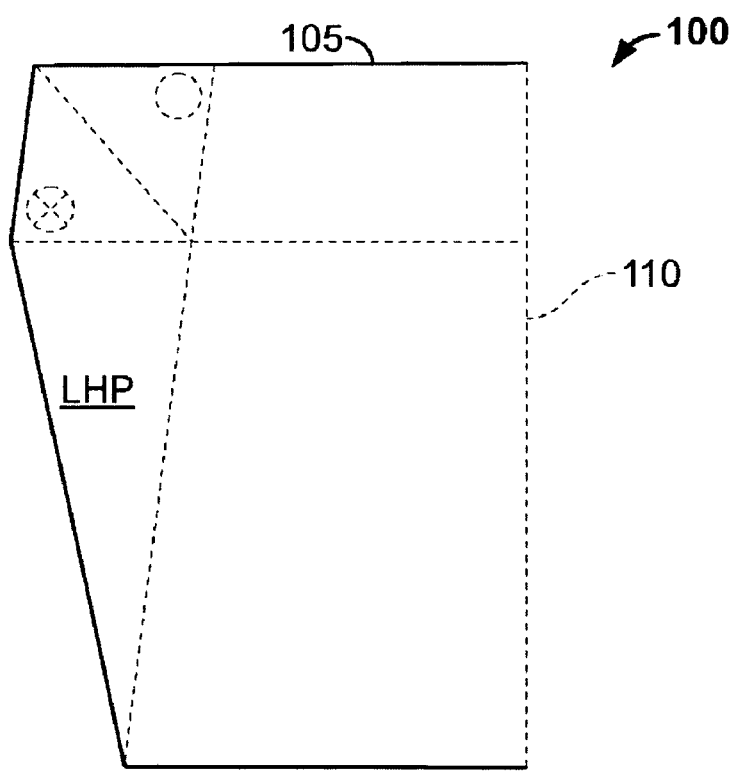
FIG. 5 is a top plan view of a folded unitary blank sheet shown in FIG. 1 transitioned to an optional holding mode.

FIG. 5 is a top plan view of support 100 in FIG. 1 transitioned to an optional holding mode. As shown, sheet 105 folds about bending portion 110, with the fastening subsystem optionally engaged to maintain sheet 105 in the folded, storage position.

Figure 6:
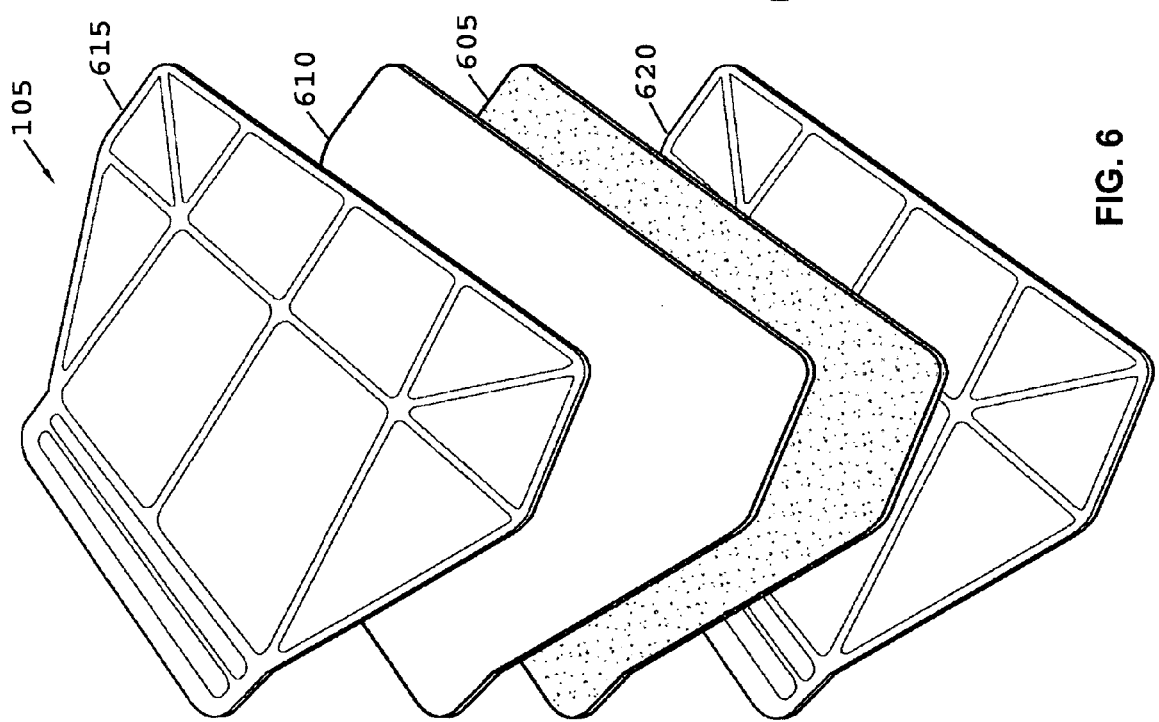
FIG. 6 is an exploded view of a first set of layers for the unitary blank sheet shown in FIG. 1.

FIG. 6 is an exploded view of a first set of layers for unitary blank sheet 105 shown in FIG. 1. Sheet 105 of FIG. 6 includes a compression molded fabric-over-foam embodiment. In this embodiment, a soft neoprene padding layer 605 and an environmental shielding material layer 610 (e.g., electromagnetic or temperature (heat) layer) is sandwiched in between a first layer 615 and a second layer 620 of fabric. The layers are sandwiched and adhered, then are compression-molded to achieve the proper crease lines, logos, and/or other required features.

Figure 7:
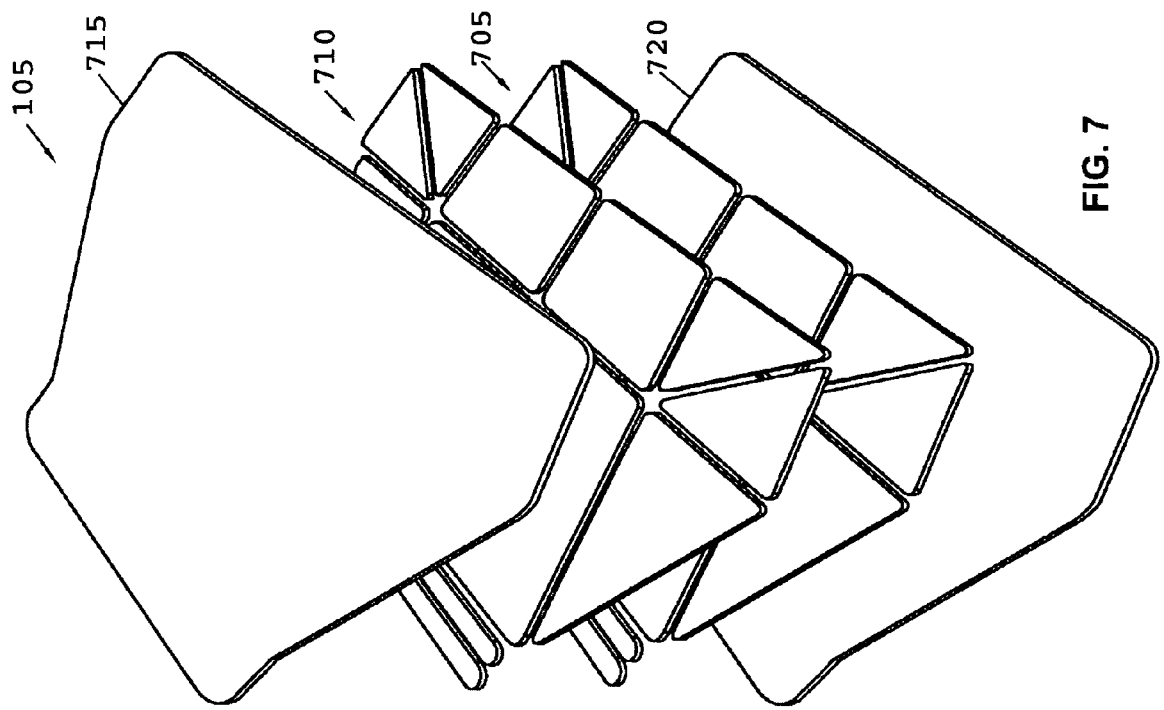
FIG. 7 is an exploded view of a second set of layers for the unitary blank sheet shown in FIG. 1.

FIG. 7 is an exploded view of a second set of layers for unitary blank sheet 105 shown in FIG. 1. Sheet 105 of FIG. 6 is made using more typical cut and sew soft goods techniques where crease bend lines are achieved by incorporating a first set of structural internal pads or plates 705 along with an optional second set of environmental internal pads or plates (e.g., electromagnetic shielding material or temperature controlling material) 710 spaced away from each other (though some embodiments including the second set may integrate the functions into one set of plates). A first fabric layer 715 and a second fabric layer 720 is sewn or attached over the set(s) of pads or plates. Sheet 105 hinges in the areas of unsupported fabric layers between the individual pads/plates.

Figure 8:
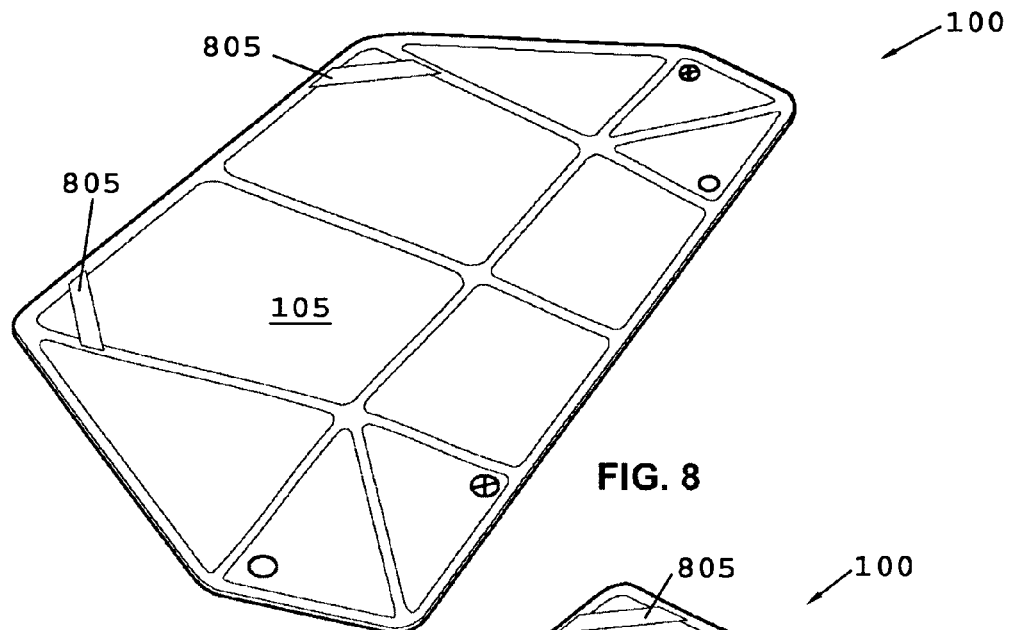
FIG. 8 through FIG. 10 are perspective views illustrating results of a sequence of steps of producing a three-dimensional support structure from the support shown in the previous figures, for example FIG. 1.
Figure 9:
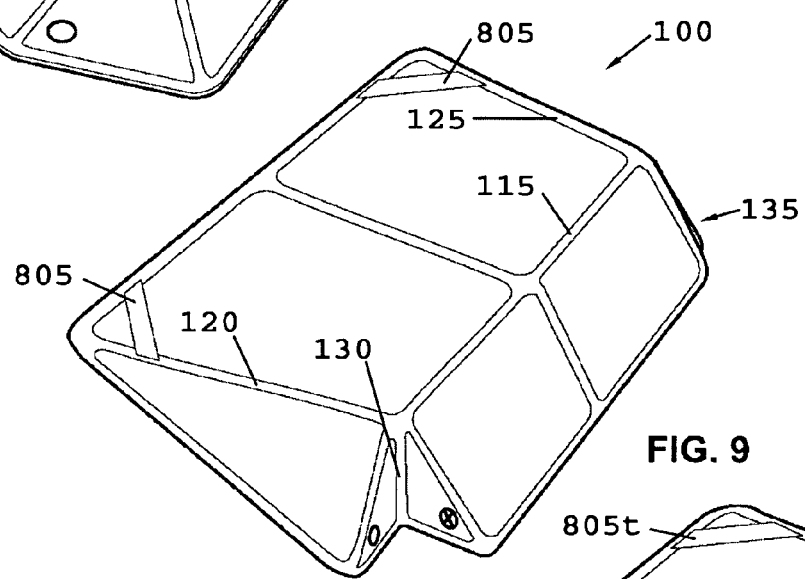
Figure 10:
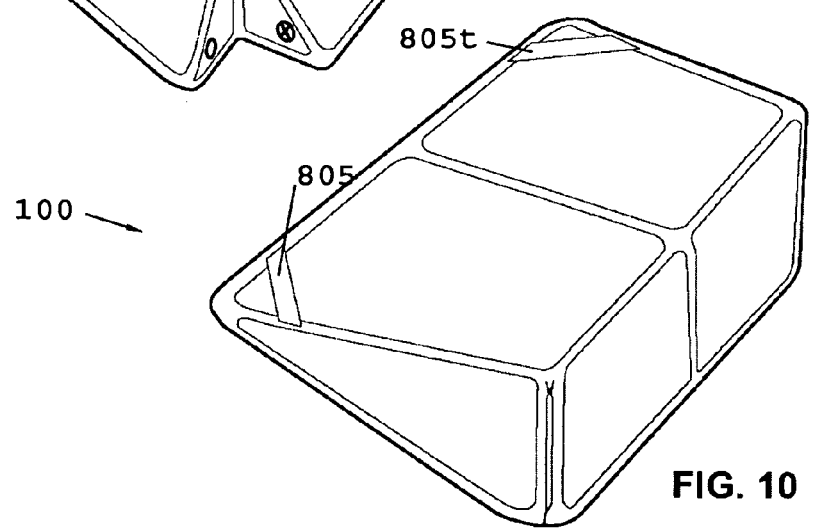

FIG. 8 through FIG. 10 are perspective views illustrating results of a sequence of steps of producing a three-dimensional folded support structure from support 100 shown generally above, for example, in FIG. 1. FIG. 8 is a perspective view of support 100 including sheet 105 as described above except including a pair of bands (or straps—optionally elastomeric) 805 as the retaining system to hold an electronic device onto the FACE when sheet 105 is transitioned to the folded support mode. FIG. 9 is the perspective view of support 100 shown in FIG. 8 partially folded and FIG. 10 is the perspective view of support 100 shown in FIG. 9 completely folded. Sheet 105 transitions from the unfolded to the folded support mode by simultaneously bending along bend line 115, bend line 120, bend line 125, bend line 130, and bend line 135. When completely folded, the fastening subsystem (shown here as two pairs of complementary snaps) engages to resist unfolding. Other fastening systems may be used as described above.

Figure 11:
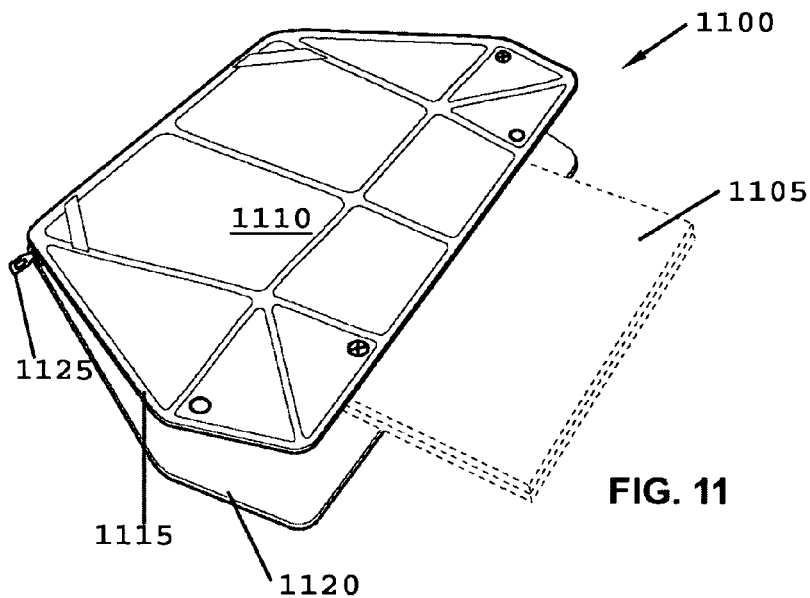
FIG. 11 is a perspective view of a carrying case stowing and porting a portable electronic device (e.g., a laptop computer or the like), the case having a unitary sheet as all or part of a first exterior wall that cooperates with a second exterior wall that produces the case.

FIG. 11 is a perspective view of a carrying case 1100 stowing and porting a portable electronic device (e.g., a laptop computer or the like) 1105, case 1100 having a unitary sheet 1110 as all or part of a first exterior wall 1115 that cooperates with a second exterior wall 1120 to produce case 1100. A fastening system 1125 opens and closes case 1100 by permitting total or partial separation of the walls.

Figure 12:
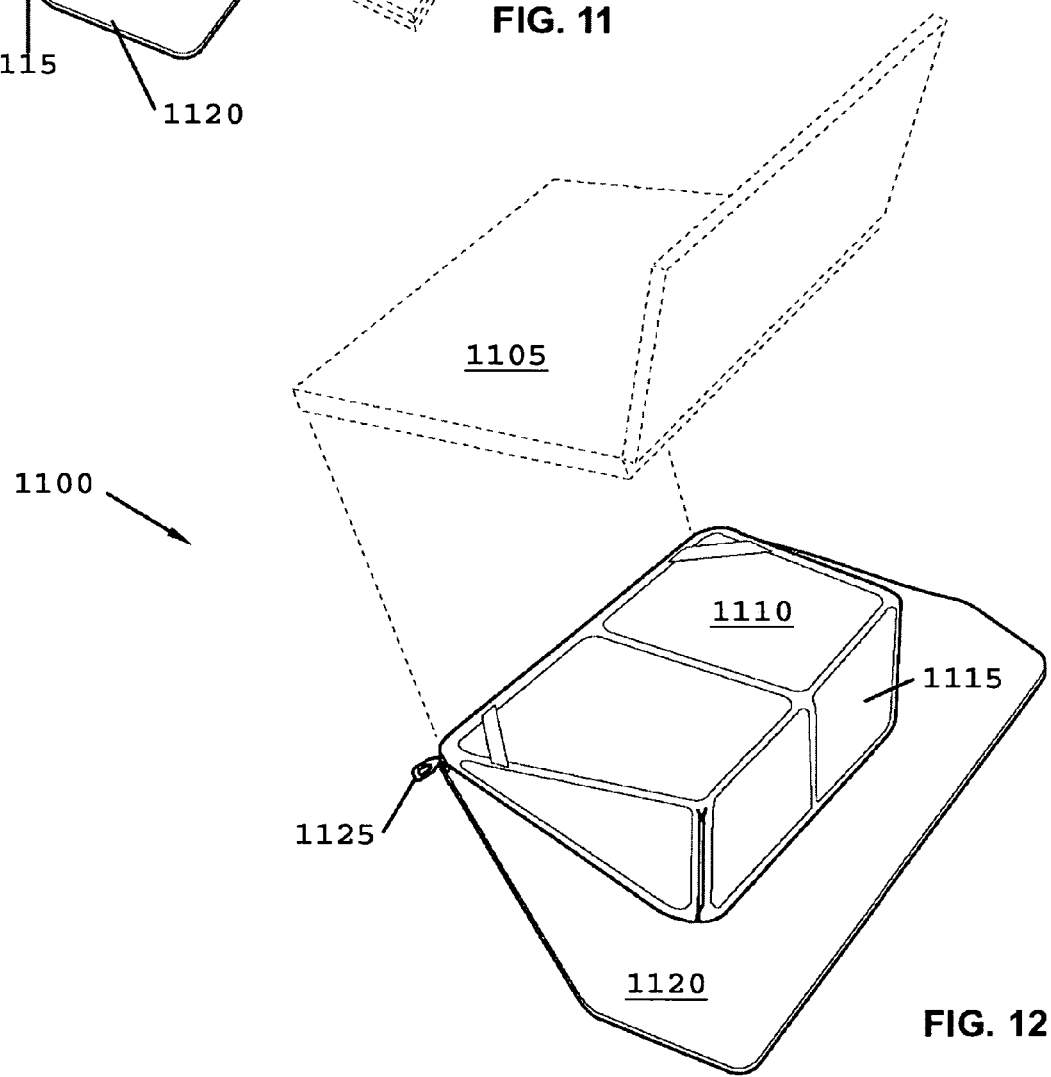
FIG. 12 is a perspective view of the carrying case shown in FIG. 11 transitioned to a folded support mode in which the sheet is folded as described herein to rigidly support the device.

FIG. 12 is a perspective view of carrying case 1100 transitioned to a folded support mode in which sheet 1110 is folded as described herein to rigidly support device 1105. An interior surface of second exterior wall 1120 may be adapted to support other devices such as for example peripheral devices (e.g., mouse or pointing device) used with device 1105.

Figure 13:
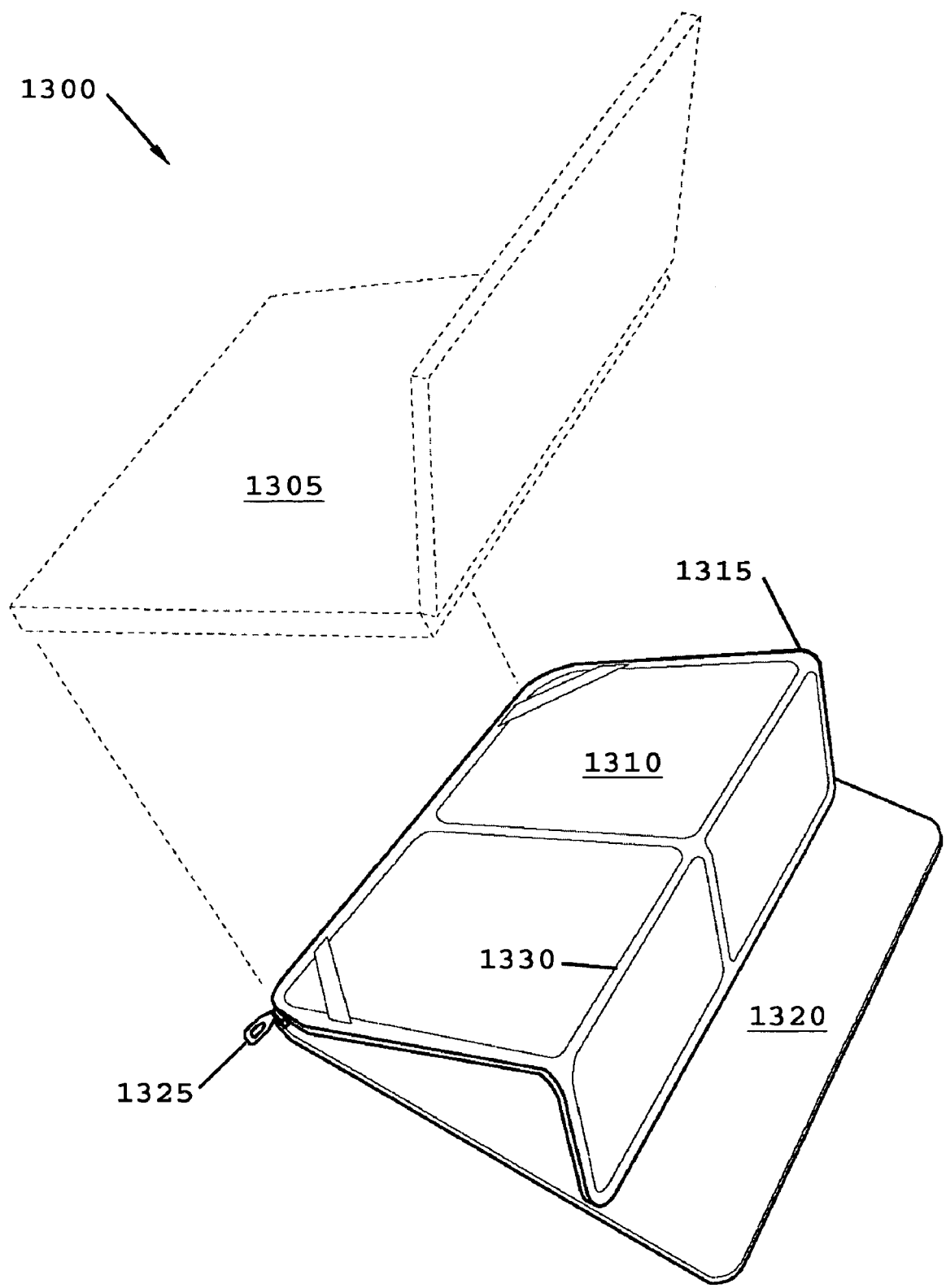
FIG. 13 is a perspective view of an alternative carrying case stowing and porting a portable electronic device (e.g., a laptop computer or the like), the case having a unitary sheet as all or part of a first exterior wall that cooperates with a second exterior wall to produce the case.

FIG. 13 is a perspective view of an alternative carrying case 1300 stowing and porting a portable electronic device (e.g., a laptop computer or the like) 1305, case 1300 having a unitary sheet 1310 as all or part of a first exterior wall 1315 that cooperates with a second exterior wall 1320 to produce case 1300. A fastening system 1125 opens and closes case 1100 by permitting total or partial separation of the walls. FIG. 13 illustrates carrying case 1300 transitioned to a folded support mode in which sheet 1310 is simply folded about a single bend line 1330 to rigidly support device 1105. An interior surface of second exterior wall 1320 may be adapted, configured, arranged, or otherwise provide for implementing or supporting a retaining system to maintain this particular bending schema. For example, the interior surface may have a lip, ledge, or latch to resist unfolding until desired by the user. Carrying case 1300 may be implemented as a rectilinear case in this embodiment as sheet 105 may include a rectangular arrangement.

Figure 14:
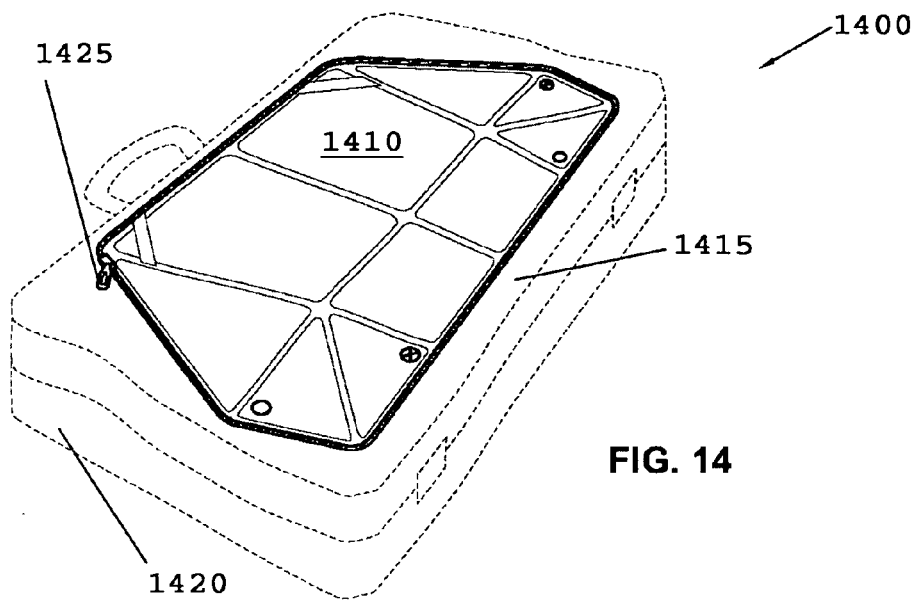
FIG. 14 is a perspective view of an alternative carrying case stowing and porting a portable electronic device (e.g., a laptop computer or the like), the case having a unitary sheet as all or part of a first exterior wall of a double-walled shell that cooperates with a second exterior wall to produce the case.

FIG. 14 is a perspective view of an alternative carrying case 1400 stowing and porting a portable electronic device (e.g., a laptop computer or the like), case 1400 having a unitary sheet 1410 as all or part of a first exterior wall 1415 of a double-walled shell that cooperates with a second exterior wall 1420 to produce case 1400. A fastening system 1425 wholly or partially detaches and attaches sheet 1410 from first exterior wall 1415.

Figure 15:
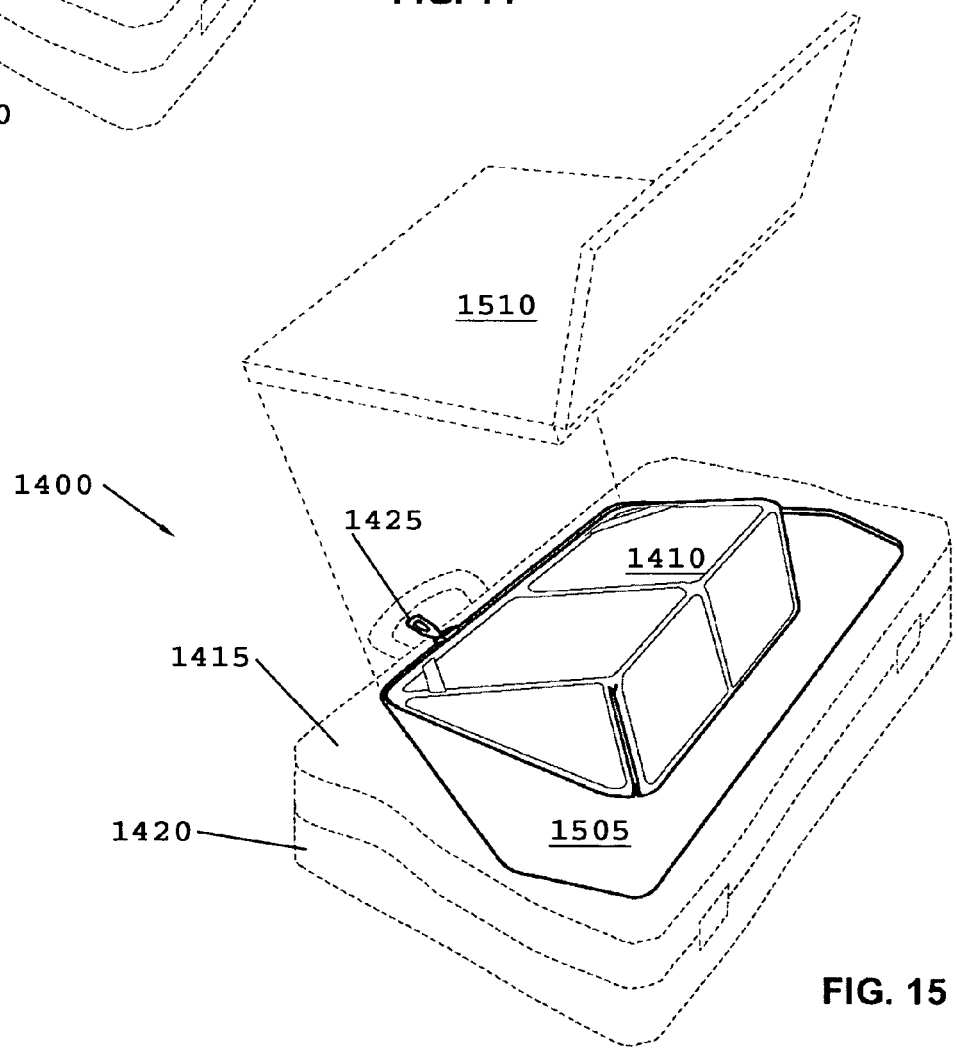
FIG. 15 is a perspective view of the carrying case shown in FIG. 14 transitioned to a folded support mode in which the sheet is partially detached from the first exterior wall to reveal an interior wall of the double-walled shell of the case.

FIG. 15 is a perspective view of carrying case 1400 transitioned to a folded support mode in which sheet 1410 is partially detached from first exterior wall 1415 to reveal an interior wall 1505 of the double-walled shell of case 1400. Sheet 1410 is folded into the folded support mode as described herein to rigidly support a device 1510. Sheet 1410 may be configured for many different folding schemas, including those shown in FIG. 1 and FIG. 13. Advantages of carrying case 1400 is that whole or partial detachment of sheet 1410 retains carrying case 1400 carrying/porting functionality and capacity because of the double-walled shell of at least one wall, and sheet 1410 may be virtually any desired shape while permitting case 1400 to have an independent shape/arrangement.

Figure 16:
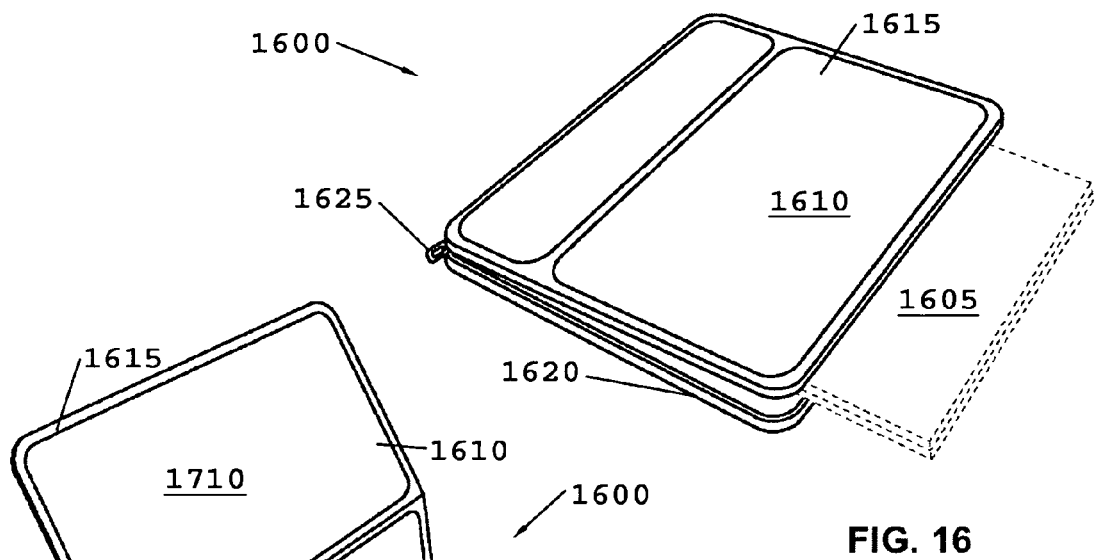
FIG. 16 is a perspective view of an alternative carrying case stowing and porting a portable electronic device (e.g., a laptop computer or the like), the case having a unitary sheet as all or part of a first wall that cooperates with a second exterior wall to produce the case.

FIG. 16 is a perspective view of an alternative carrying case 1600 stowing and porting a portable electronic device (e.g., a laptop computer or the like) 1605, case 1600 having a unitary sheet 1610 as all or part of a first wall 1615 that cooperates with a second exterior wall 1620 to produce case 1600. A fastening system 1625 wholly or partially detaches and attaches first exterior wall 1615 to second exterior wall 1620.

Figure 17:
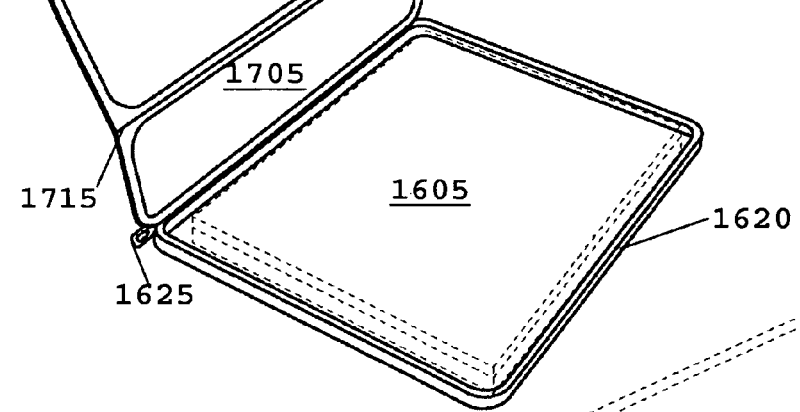
FIG. 17 is a perspective view of the carrying case of FIG. 16 mid-transition between a case mode (FIG. 16) and a support mode (FIG. 18 below)
Figure 18:
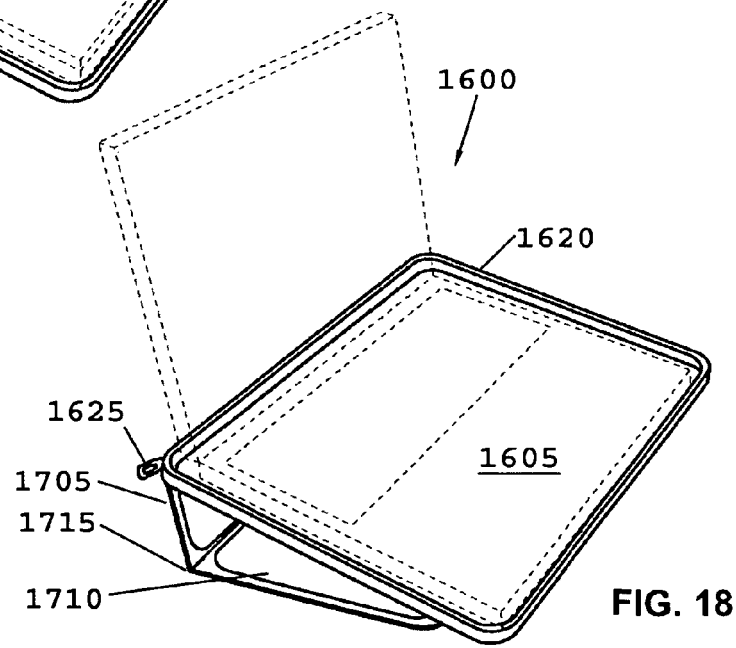
FIG. 18 is a perspective view of the carrying case of FIG. 16 transitioned to the support mode in which the sheet is flipped under and folded to generally juxtapose exterior surfaces of the exterior walls.

FIG. 17 is a perspective view of carrying case 1600 mid-transition between a case mode (FIG. 16) and a support mode (FIG. 18 below). Sheet 1610 is divided into a back panel 1705 and a face panel 1710 by a bending portion 1715, with the back panel hingedly attached to second exterior wall 1620.

FIG. 18 is a perspective view of carrying case 1800 transitioned to the support mode in which sheet 1610 is flipped under and folded to generally juxtapose exterior surfaces of the exterior walls. Sheet 1610 is folded into the folded support mode as described herein to rigidly support device 1605. Advantages of carrying case 1600 is that device 1605 does not have to be removed from the case, sheet 1610 may be rectangular, and the retaining subsystem is simply part of the interior of second exterior wall 1620 and no additional straps or edges need be provided.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus, comprising:
   a unitary blank of a substantially planar sheet material including a plurality of panel portions interdivided by one or more bending line portions, wherein said unitary blank folds along said one or more bending line portions to produce a three-dimensional structure that supports a portable electronic device on at least one said panel portion over a surface at an angle inclined relative to said surface; and
   a fastening subsystem, coupled to said unitary blank, having a holding mode for maintaining said unitary blank folded in said three-dimensional structure and a release mode for transitioning said three-dimensional structure to a planar structure, said fastening subsystem providing for repeatable transitions between said holding mode and said release mode.

2. The apparatus of claim 1 wherein said fastening subsystem includes a first connector coupled to a first panel portion of said plurality of panel portions and a second connector complementary to said first connector coupled to a second panel portion of said plurality of panel portions, said connectors engaged in said holding mode and disengaged in said release mode.

3. The apparatus of claim 1 wherein said fastening subsystem includes a zipper having a pair of mating strips each strip including a row of teeth, a first strip coupled to said unitary blank along a first bending line portion and a second strip coupled to said unitary blank along a second bending line portion wherein said rows of teeth engage each other in said holding mode and wherein said rows of teeth disengage each other in said release mode.

4. The apparatus of claim 1 wherein said unitary blank is incorporated into a wall of a carrying case for said portable electronic device.

5. The apparatus of claim 4 wherein said plurality of panel portions include a face panel portion and a back panel portion with said bending line portion interposed therebetween.

6. The apparatus of claim 1 wherein said unitary blank forms a wall of a carrying case for said portable electronic device.

7. The apparatus of claim 6 wherein said unitary blank is detachable from said carrying case.

8. The apparatus of claim 6 wherein said wall includes an entire first side of said carrying case opposite an entire second side of said carrying case wherein internal surfaces of said sides form a cavity for said portable electronic device in a carrying mode, said entire first wall hingedly coupled to said entire second wall and including a lateral bending line portion, said entire first wall transitioning to a support mode having external surfaces of said sides juxtaposed and said entire first side bent along said lateral bending line portion overlying said surface to position said internal surface of said entire second side at said angle.

9. The apparatus of claim 1 wherein said sheet material includes compression molded fabric over foam.

10. The apparatus of claim 1 further comprising a retaining subsystem, coupled to one or more of said panel portions, to resist movement of said portable electronic device down said at least one panel portion.

11. The apparatus of claim 10 wherein said retaining subsystem includes a panel extension that physically inhibits movement of said portable electronic device down said at least one panel portion.

12. The apparatus of claim 10 wherein said retaining subsystem includes a band that physically inhibits movement of said portable electronic device down said at least one panel portion.

13. The apparatus of claim 10 wherein said retaining subsystem includes an enhanced frictional surface on said at least one panel portion that physically inhibits movement of said portable electronic device down said at least one panel portion.

14. The apparatus of claim 1 wherein said sheet material is rigid material supporting a weight of said portable electronic device.

* * * * *